(12) United States Patent
Calman et al.

(10) Patent No.: US 12,290,832 B1
(45) Date of Patent: May 6, 2025

(54) HEAT GUN ENGAGING ROLLER TOOL FOR USE IN APPLYING ADHESIVE SHEET MATERIAL TO SURFACES

(71) Applicants: Kenneth J. Calman, Fort Lauderdale, FL (US); Kathryn S. Calman, Fort Lauderdale, FL (US)

(72) Inventors: Kenneth J. Calman, Fort Lauderdale, FL (US); Kathryn S. Calman, Fort Lauderdale, FL (US)

(*) Notice: Subject to any disclaimer, the term of this patent is extended or adjusted under 35 U.S.C. 154(b) by 933 days.

(21) Appl. No.: 17/358,729

(22) Filed: Jun. 25, 2021

Related U.S. Application Data

(60) Provisional application No. 63/102,762, filed on Jun. 29, 2020.

(51) Int. Cl.
*B05C 17/02* (2006.01)

(52) U.S. Cl.
CPC ........ *B05C 17/022* (2013.01); *B05C 17/0205* (2013.01); *B05C 17/0245* (2013.01)

(58) Field of Classification Search
CPC .............. B05C 17/022; B05C 17/0205; B05C 17/0245
See application file for complete search history.

(56) References Cited

U.S. PATENT DOCUMENTS

| | | | |
|---|---|---|---|
| 5,090,084 A * | 2/1992 | De Guzman | B05C 17/0217 15/230.14 |
| 9,415,540 B1 * | 8/2016 | Calman | B29C 66/83411 |
| 9,597,863 B2 * | 3/2017 | Calman | B29C 65/48 |
| 2004/0052570 A1 * | 3/2004 | McKay | A47L 13/26 401/219 |

* cited by examiner

*Primary Examiner* — Steven W Crabb
*Assistant Examiner* — Kuangyue Chen
(74) *Attorney, Agent, or Firm* — Ice Miller LLP

(57) ABSTRACT

A roller with a roller attachment adapted to be releasably engaged or attached to the output tube of a heat gun and to direct that hot air output toward the sheet material at a point where it is being applied ahead of the roller, and a method of applying a sheet material by comprising smoothing the sheet material against a surface.

10 Claims, 22 Drawing Sheets

HEAT GUN ENGAGING ROLLER TOOL FOR USE IN APPLYING ADHESIVE SHEET MATERIAL TO SURFACES

RELATED APPLICATION DATA

This application claims the priority benefit of U.S. Provisional Application No. 63/102,762, entitled Heat Gun Roller, filed Jun. 29, 2020, which is hereby incorporated in its entirety herein by reference.

FIELD OF THE INVENTION

The present invention relates to a roller tool for use in applying adhesive sheet material, such as adhesive bearing wraps and the like to surfaces.

BACKGROUND OF THE INVENTION

Adhesive sheet materials (especially those bearing graphics) are becoming the increasingly popular choice for advertising or otherwise displaying graphics on signs, automobiles, buildings, and numerous other surfaces. These materials typically include a vinyl material bearing desired images and/or text on the display side, with an adhesive on the application side. Such vinyl material is best applied once gently heated during the application process, the heat serving both to render the adhesive sheet material more pliable and thus amenable to compliance with the application surface contour, as well as activating the adhesive itself.

Often, the adhesive material must be heated in order to securely apply it to the intended substrate. Generally, a propane or other combustible gas torch is used to the heat the adhesive material. Uniform application, however, can often be difficult, as air bubbles commonly get trapped between the adhesive material and substrate.

Such methods can be cumbersome, and even dangerous for the applicator and/or bystanders, depending on the application environment, frequently requiring the use of several tools thus slowing the application process. Therefore, there remains a need for a tool that can allow a person quickly and flawlessly to apply adhesive sheet materials to surfaces. In this regard, it is desirable to be able to apply, relatively quickly and effectively, controllable heat to portions of an adhesive graphic material and to be able conveniently to position, affix, and smooth heated portions of the adhesive graphic material to the desired surface, typically in a repetitive progression.

There remains a need for devices and methods that provide for the application and smoothing of adhesive sheet materials along with the efficient and accurate direction of heat to the sheet material at a point where it is being applied.

SUMMARY OF THE INVENTION

The embodiments of the invention and the method described herein address the shortcomings of the prior art. In general terms, the invention may be described as including the following:

The present disclosure includes improvements to the devices and methods described in U.S. Provisional Application No. 61/516,456, filed Jun. 29, 2021, and in issued U.S. Pat. Nos. 9,415,540 and 9,597,863, which are hereby incorporated in their entirety herein by reference, as well as to other similar devices.

The present invention generally includes a roller attachment adapted to be releasably engaged or attached to the output tube of a heat gun and to direct that hot air output toward the sheet material at a point where it is being applied ahead of the roller, such that the heat gun is more regularly positioned with respect to the application surface and is able to function to asset in control of the roller tool.

It is preferred that the roller attachment include an optional additional handle portion, preferably arranged opposite the roller's facing surface, to allow the user to provide additional support or leverage in using the roller.

In general terms, the invention includes a handheld heat gun and engaged or attached roller system, comprising: (a) roller having a roller surface, (b) a roller attachment extend forward of the roller and adapted to be engaged or attached to the output tube of a heat gun, and (c) a handle portion; and (d) an apertured heat gun-roller attachment/engagement bracket engaged or attached so as to engage and hold in place the output tube of a heat gun, so as to direct heat gun output forward of the roller surface.

In one embodiment of the present invention, the apertured roller attachment is disposed such that the heat gun output is directed to one side of the roller's longitudinal axis, and the roller having a roller surface facing to that same side of the roller's longitudinal axis when the output tube of a heat gun installed on the apertured roller attachment. In a most preferred embodiment, the output tube of a heat gun's directional axis is substantially coplanar with the directional line of the roller surface. See positional relationship between directional axis A and directional line B.

The roller device of the present invention may be constructed from various metals and or plastic materials, incorporated with but not limited to foam, rubber and/or fabric materials including but not limited to micro-fiber material, though not limited to such materials, and in accordance with manufacturing techniques known and used in the art, such as milling, machining and stamping and the like.

The present invention also includes an embodiment wherein the roller attachment further comprises a handle. The handle may be integrally formed as part of the roller attachment or it may be removably attached thereto.

The roller attachment of the present invention may be comprised of any material such as plastic, resin, or metal of sufficient rigidity to hold the roller and heat gun securely in place. The roller of the present device is preferably comprised of a resilient polymer foam comprising neoprene. The resilience of the roller material may be varied to conform with the nature (e.g. hardness, uniformity, etc.) of the application surface. For example, a soft neoprene rubber roller may be used for a cement wall or a trailer comprising bolted panels, while a stiffer rubber might be used for applications to an inflated balloon or foam mat. The core of the roller may be comprised of any material such as metal or plastic; and is preferably comprised of aluminum.

The present invention also includes a handheld heat gun and roller system, comprising: (a) roller having a roller surface, (b) a roller attachment extend forward of the roller and adapted to be attached to the output tube of a heat gun, and (c) a handle portion; (d) an apertured heat gun-roller attachment/engagement bracket attached so as to engage and hold in place the output tube of a heat gun, so as to direct heat gun output forward of the roller surface; and (e) a heat gun comprising an output tube attached to the apertured roller attachment.

The roller attachment/engagement bracket is adapted to be removably engaged or attached to the output tube of a heat gun, and also to permit the heat output to be directed to that same side of the roller's longitudinal axis A (see the positional relationship between the direction of both directional axis A and directional line B, as compared to the aperture axis C of the roller attachment/engagement bracket), and with the heat gun output tube's directional axis (aperture axis C) directed to an area forward of the roller and below the one or more apertures of the heat gun-roller attachment/engagement bracket.

The handle portion and the heat gun-roller engagement bracket are disposed at an angle to one another (such as the angle between heat gun-roller attachment/engagement bracket axis B and handle axis D) in order to leave unobstructed one side of the roller as the application side to be urged against the applied sheet material, while the roller device is handled and controlled from the opposite side, as will be apparent from the exemplary Figures.

In some embodiments, the nozzle axis is substantially coplanar with the directional line of the roller surface, i.e., the nozzle and roller generally face the same direction and preferably such that their directed actions are along generally parallel vectors.

The present invention also includes a handheld heat gun wherein the roller attachment further comprises a handle. The handle may be integrally formed as part of the roller attachment or may be removably attached to the gas cylinder independent of the roller attachment. Preferably, the handle extends substantially parallel the longitudinal axis of the container, on the opposite side of the container from the roller surface. Similarly, in another embodiment of the present invention, the roller attachment further comprises a pocket clip that may be integrally formed as part of the roller attachment or it may be removably attached independently.

The roller device of the present invention may include a machine designed application device made from but not limited to various metals and or plastic materials, incorporated with but not limited to foam, rubber and/or fabric materials including but not limited to micro-fiber material.

The roller device of the present invention provides an applicator with a solid metal core roller axle with copper, brass or similar bushings that can be held together on the device with either a long axle shoulder bolt through the center of the metal core roller rim allowing the roller rim but not the axle to spin, or by drilling and tapping each end of the roller rim and screwing a shoulder bolt to each end of the goal post allowing the whole roller rim and end bolts to turn when the wheel rotates, such as shown in FIGS. 1 and 2).

The present invention also includes a method of applying a sheet material to a surface by a heat-activated adhesive borne on the sheet material using a handheld heat gun having a heat nozzle and a releasably attached or engaged roller, the method comprising the steps: (a) placing the sheet material against the surface having a contour; (b) placing the roller device against the surface of the sheet material and engaging or attaching the handheld heat gun so as to direct heated air from the heat nozzle through the heat gun-roller attachment/engagement bracket toward the sheet material; and (c) smoothing the sheet material against the surface with the roller so as to adhere the sheet material onto the surface, such that the sheet material follows the contour of the surface. These steps may be repeated along the face of the sheet material as the sheet material is applied to a surface.

The present invention further includes a method of applying a sheet material to a surface by a heat-activated adhesive borne on the sheet material using a handheld heat gun having a heat nozzle and an engaged or attached roller, the method comprising the steps: (a) placing a first portion of the sheet material against (i.e., alongside or in contact with) a first portion of the surface having a first contour; (b) orienting the handheld heat gun so as to direct heated air from the heat nozzle through the heat gun-roller attachment/engagement bracket toward the first portion of the sheet material; (c) orienting the handheld heat gun so as to place the roller against the first portion of the sheet material; and (d) smoothing the first portion of the sheet material against the first portion of the surface with the roller so as to adhere the first portion of the sheet material onto the first portion of surface, such that the first portion of the sheet material follows the first contour; and, thereafter, (h) placing a second portion of the sheet material against a second portion of the surface having a second contour; (i) orienting the handheld heat gun so as to direct heated air from the heat nozzle through the heat gun-roller attachment/engagement bracket toward the second portion of the sheet material; (j) orienting the handheld heat gun so as to place the roller against the second portion of the sheet material; and (k) smoothing the second portion of the sheet material against the second portion of the surface with the roller so as to adhere the second portion of the sheet material onto the second portion of surface, such that the second portion of the sheet material follows the second contour. These steps may be further repeated progressively to additional portions of the sheet material to apply them to further portions of the surface.

The present invention also includes a releasable roller attachment for a gas cylinder, comprising: (a) a roller and (b) an attachment fixture adapted to be attached to a gas cylinder. The attachment fixture of the present invention may comprise a compression ring arrangement adapted to extend around and be attached to the gas cylinder. The fixture may be removably or permanently attached.

In another embodiment, the heat gun-roller attachment/engagement bracket may itself additionally comprise a handle portion attached to the heat gun-roller attachment/engagement bracket.

The present invention thus includes a roller device, comprising: (a) a roller bracket rotatably supporting a roller having a roller surface; (b) a handle portion extending along a first direction from the roller bracket; and (c) a heat gun-roller attachment/engagement bracket extending a second direction from the roller bracket and having at least one (and in some embodiments two or more) aperture(s) adapted to releasably engage the output tube of a heat gun. The roller rotates about a roller axis and the handle portion in some embodiments extends substantially perpendicular to the roller axis.

The heat gun-roller attachment/engagement bracket may extend at an angle to the handle portion, such as at an obtuse angle to the handle portion.

The roller device may comprise an adjustable attachment between the heat gun-roller attachment/engagement bracket and the roller bracket, such that the angle may be varied.

The present invention also includes a sheet material application system comprising the roller device as described above comprising: (a) a roller bracket rotatably supporting a roller having a roller surface; (b) a handle portion extending along a first direction from the roller bracket; and (c) a heat gun-roller attachment/engagement bracket extending a second direction from the roller bracket and having at least one (and in some embodiments two or more) aperture(s) adapted to releasably engage the output tube of a heat gun, and further including (d) a heat gun having a handle and an output nozzle, the output nozzle releasably extending through the at least one aperture. The heat gun has an output nozzle, with the output nozzle rotatably extending through the at least one aperture.

The present invention further includes a method of applying a sheet material to a surface by a heat-activated adhesive borne on the sheet material using an integrated roller system having at least one handle and an affixed roller, the method comprising the steps: (a) placing the sheet material against the surface having a contour; (b) directing heat toward the sheet material so as to activate the adhesive, the heat being directed from a sheet material application system comprising: (1.) a roller bracket rotatably supporting a roller having a roller surface; (2.) a handle portion extending along a first direction from the roller bracket; (3.) a heat gun-roller attachment/engagement bracket extending a second direction from the roller bracket, and having at least one aperture to releasably engage the output tube of a heat gun; and (4.) a heat gun having a heat gun handle and an output nozzle, the output nozzle releasably extending through the at least one aperture; and further (c) orienting the handle portion so as to place the roller against the sheet material; and (d) smoothing the sheet material against the surface with the roller so as to adhere a first portion of the sheet material onto the surface, such that the first portion of the sheet material follows the contour of the surface. The method may also include the step of rotating the handle portion with respect to the heat gun handle following step (d), and may further include smoothing the sheet material against the surface with the roller so as to adhere a second portion of the sheet material onto the surface, such that the second portion of sheet material follows the contour of the surface.

DETAILED DESCRIPTION OF THE PREFERRED EMBODIMENTS

In accordance with the foregoing summary, the following is a detailed description of the preferred embodiments of the invention, which are considered to be the best modes thereof. The preferred methods and systems herein described are not intended to be exhaustive or to limit the invention to the precise forms disclosed.

Figure 1:
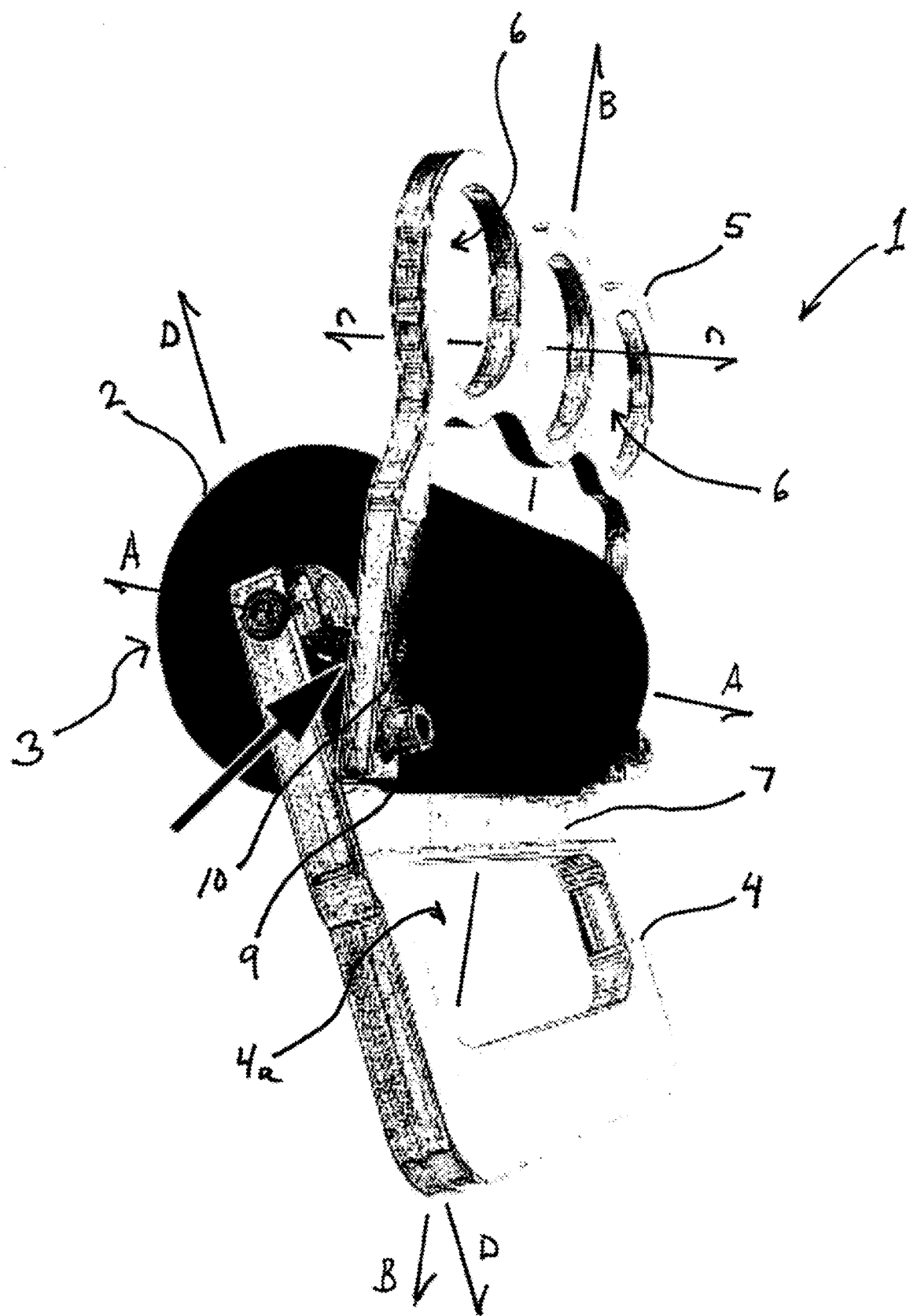
FIG. 1 is a side perspective view of the roller tool in accordance with one embodiment of the present invention.

FIG. 1 is a side perspective view of the roller tool in accordance with one embodiment of the present invention.

FIG. 1 shows the roller tool 1 comprising a roller 2 having an application-facing roller surface 3. FIG. 1 further shows roller tool 1 having a roller handle 4 having hand slot 4a, and roller attachment/engagement bracket 5. Roller attachment/engagement bracket 5 comprises one or more attachment/engagement apertures 6 dimensioned to accept and engage the nozzle or output tube of a heat gun, and to align and direct the heated air from the heat gun toward a sheet material as it is applied. See FIGS. 7 and 9, as an example. It will be appreciated that the attachment/engagement apertures 6 should be dimensioned to permit the engagement of the nozzle or output tube of a heat gun such that the heat gun output reaches the sheet material as it is being applied. In some embodiments, the nozzle or output tube of a heat gun may fit loosely, but with sufficiently little play that the operator may effectively use the heat gun handle as a second handhold to guide and depress the roller against the sheet material as it is being applied. The one or more attachment/engagement apertures 6 may be dimensioned to permit the end of the nozzle or output tube of a heat gun may extend through the aperture(s), but, by virtue of a portion of greater width of the upstream nozzle or output tube of a heat gun (or even a lip therein) may bear against the upper side of the roller attachment/engagement bracket 5 to be able to transmit hand force therethrough to the roller 2.

This relatively free-turning arrangement also permits the operator to hold the heat gun in one hand while the roller device is rotated with respect to the heat gun, thus permitting the operator to change the rolling direction while maintaining the heat gun output directed to the area of sheet material application.

Otherwise, the attachment/engagement apertures 6 may be dimensioned to permit the end of the nozzle or output tube of a heat gun to fit therein by an interference fit that can be overcome with the operator's hand force, to maintain the nozzle or output tube of a heat gun snuggly in the attachment/engagement aperture(s) 6. If desired, the attachment/engagement apertures 6 may be provided with a screw or the like, though in many instances, this is not necessary as the operator typically will repeatedly place the nozzle or output tube of a heat gun into the attachment/engagement aperture(s) 6, and remove it therefrom (i.e., along axis C) during the sheet application process that typically requires repositioning of the roller/heat gun arrangement.

The attachment/engagement apertures 6 may be dimensioned to permit the end of the nozzle or output tube of a heat gun to fit therein by an interference fit that can be overcome with the operator's hand force, to maintain the nozzle or output tube of a heat gun in the attachment/engagement bracket 5 at one or more positions, such that the assembly can be maintained as a integral system, if desired.

It will be appreciated that roller handle 4 and attachment/engagement bracket 5 may be disposed on one side of roller 2 to leave roller application surface 3 clear of any obstruction or hand interference. In the displayed embodiment, roller handle 4 and attachment/engagement bracket 5 are planar having respective plane axes D and B, respectively. The angle of the roller handle 4 and attachment/engagement bracket 5 may be fixed or attachment/engagement bracket 5 may be cantilevered off the roller bracket body 7 body connected to roller axle 8, such as through the use of a loosely fitting screw 9 and set screw 10 (see FIG. 2), such that the angle is adjustable (effectively moving the attachment/engagement bracket 5 further from the application side of the roller 2), to position the heat source for proper distancing of the heat source to the type of media being applied. The cantilever allows for moveable concentrated heat positions and counteracts the heat sync quality of the metal used in manufacturing the tool so as to keep the handle cool even during extended operation.

In this regard, commercially available heat guns are typically capable of expelling heated air in the range of from about 200 to about 1150 degrees, such that allowance can be made taking into consideration the type of material being applied, and the distance the heat source is maintained by the attachment/engagement bracket 5. The cantilever arrangement (or equivalent fixedly adjustable mechanical arrangement) allows for moveable concentrated heat positions and counteracts the heat sync quality of the metal used in manufacturing the tool handle 4, so as to keep the handle cool even during extended operation.

Figure 2:
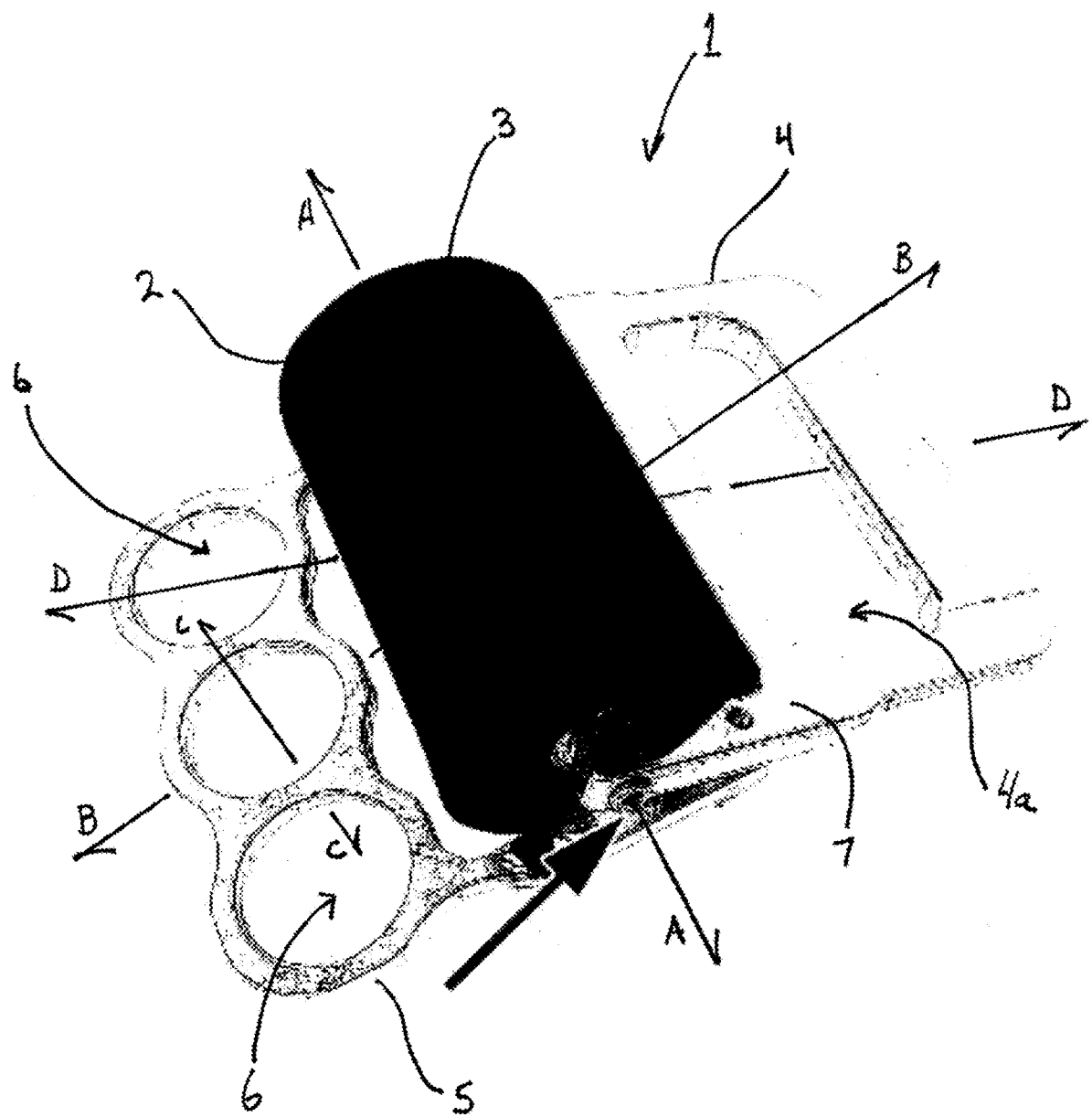
FIG. 2 is a lower perspective view of a roller device in accordance with one embodiment of the present invention.

FIG. 2 is a lower perspective view of a roller device in accordance with one embodiment of the present invention shown in FIG. 1, and wherein like numerals refer to like elements. FIG. 2 shows the relative position of roller 3, roller handle 4, and roller attachment/engagement bracket 5 from the perspective of the operator. From this view one can appreciate the position of handle 4 as it is gripped through hand slot 4a such that the operator, once heat gun output tube or nozzle engages roller attachment/engagement bracket 5 through one of the attachment/engagement apertures 6, may control and direct the heated air to the application side 3 of roller 2 as it is urged against and rolled on sheet material.

This Figure also more clearly shows how the angle of the roller handle 4 and attachment/engagement bracket 5 may be adjusted by being cantilevered off the roller bracket body 7 body connected to roller axle 8, in this embodiment through the use of a loosely fitting screw 9 and set screw 10, such that the angle is adjustable (effectively moving the attachment/engagement bracket 5 further from the application side 3 of the roller 2), to position the heat source for proper distancing of the heat source.

Figure 3:
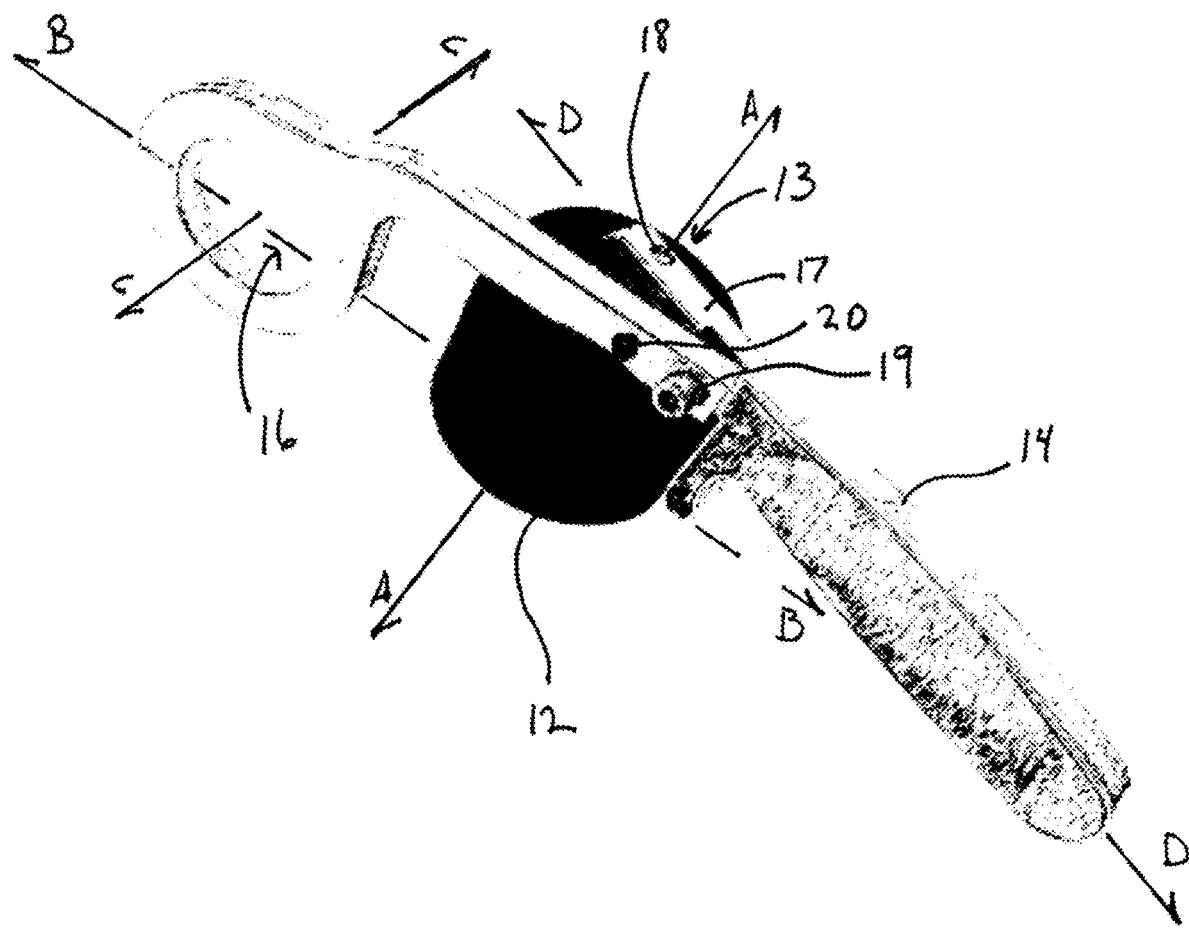
FIG. 3 is an upper side (i.e., handling/operator side) perspective view of a roller device in accordance with another embodiment of the present invention.

FIG. 3 is an upper side (i.e., handling/operator side) perspective view of a roller device in accordance with another embodiment of the present invention. This embodiment features a simpler construction featuring an elongate handle and a single attachment/engagement aperture.

FIG. 3 shows roller tool 11 having a roller handle 14, and roller attachment/engagement bracket 15. Roller attachment/engagement bracket 15 comprises one attachment/engagement aperture 16 dimensioned to accept and engage the nozzle or output tube of a heat gun, and to align and direct the heated air from the heat gun toward a sheet material as it is applied. See FIG. 8, as an example. It will be appreciated that the attachment/engagement aperture 16 should be dimensioned to permit the engagement of the nozzle or output tube of a heat gun such that the heat gun output reaches the sheet material as it is being applied. In some embodiments, the fit of the nozzle or output tube of a heat gun may fit loosely, but with sufficiently little pay that the operator may effectively use the heat gun handle as a second handhold to guide and depress the roller against the sheet material as it is being applied. The one or more attachment/engagement aperture 16 may be dimensioned to permit the end of the nozzle or output tube of a heat gun may extend through the aperture(s), but, by virtue of a portion of greater width of the upstream nozzle or output tube of a heat gun (or even a lip therein) may bear against the upper side of the roller attachment/engagement bracket 15 to be able to transmit hand force therethrough to the roller 12. Otherwise, the attachment/engagement aperture 16 may be dimensioned to permit the end of the nozzle or output tube of a heat gun to fit therein by an interference fit that can be overcome with the operator's hand force, to maintain the nozzle or output tube of a heat gun snuggly in the attachment/engagement aperture 16. If desired, the attachment/engagement aperture 16 may be provided with a screw or the like, though in many instances, this is not necessary as the operator typically will repeatedly place the nozzle or output tube of a heat gun into the attachment/engagement aperture 16, and remove it therefrom (i.e., along axis C) during the sheet application process that typically requires repositioning of the roller/heat gun arrangement.

This Figure also more clearly shows how the angle of the roller handle 14 and attachment/engagement bracket 15 may be adjusted by being cantilevered off the roller bracket body 17 body connected to roller axle 18, in this embodiment through the use of a loosely fitting screw 19 and set screw 20, such that the angle is adjustable (effectively moving the attachment/engagement bracket 15 further from the application side 13 of the roller 12), to position the heat source for proper distancing of the heat source.

Figure 4:
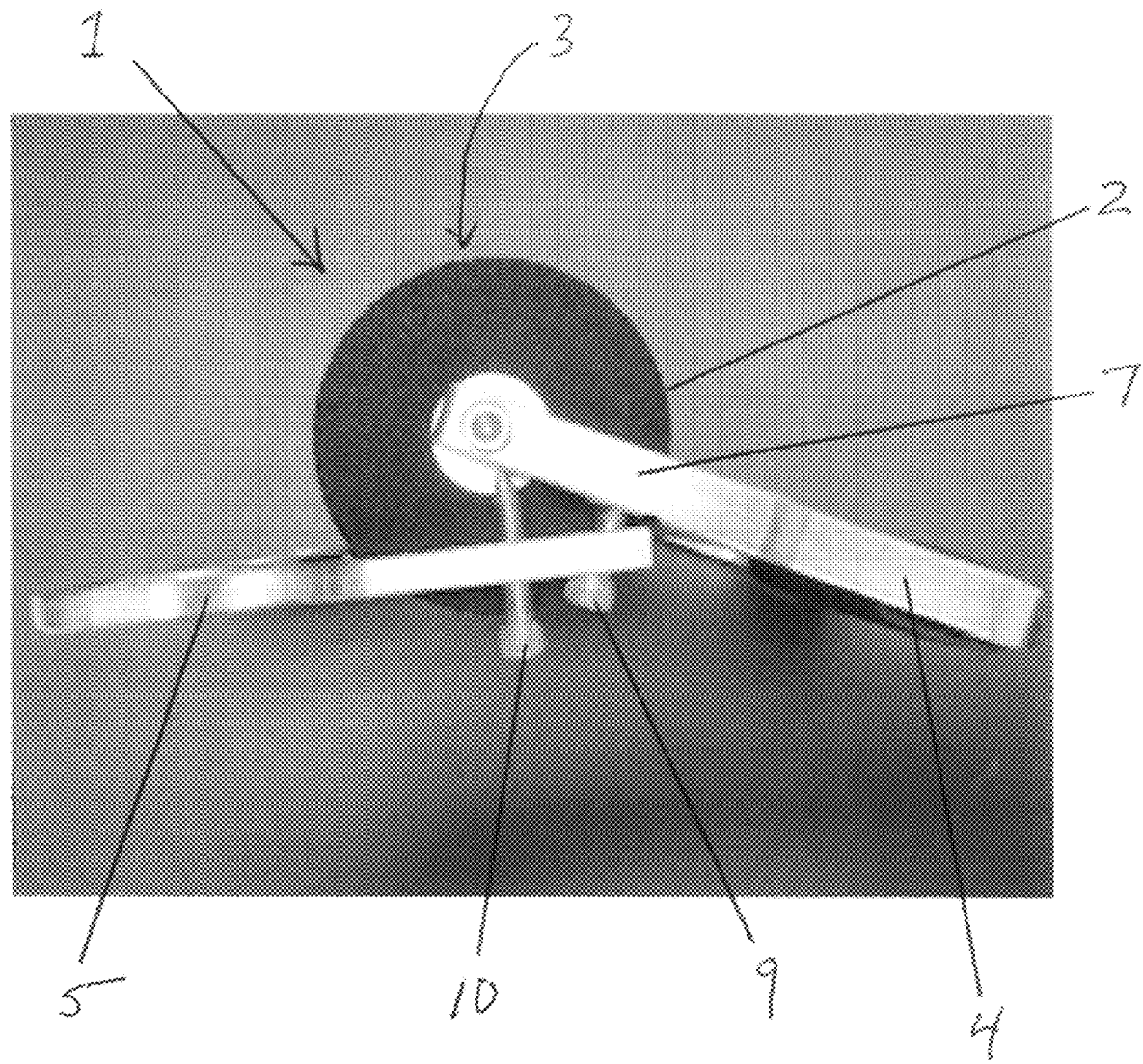
FIG. 4 is a lateral elevation view of a roller device in accordance with one embodiment of the present invention.

FIG. 4 is a lateral elevation view of a roller device in accordance with one embodiment of the present invention shown in FIG. 1, and wherein like numerals refer to like elements.

Figure 5:
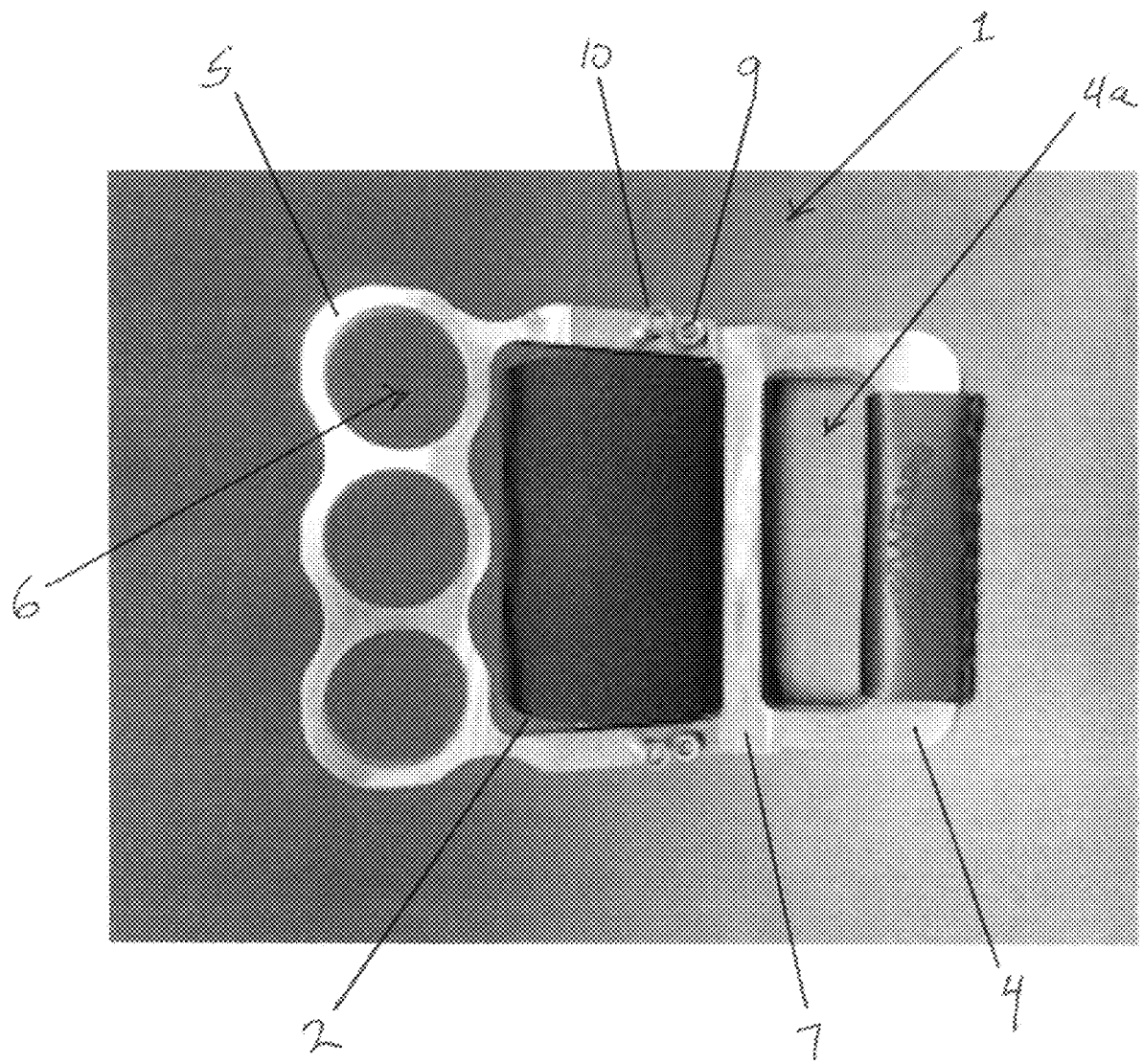
FIG. 5 is an upper side (i.e., handling/operator side) plan view of a roller device in accordance with one embodiment of the present invention

FIG. 5 is an upper side (i.e., handling/operator side) plan view of a roller device in accordance with one embodiment of the present invention shown in FIG. 1, and wherein like numerals refer to like elements.

Figure 6:
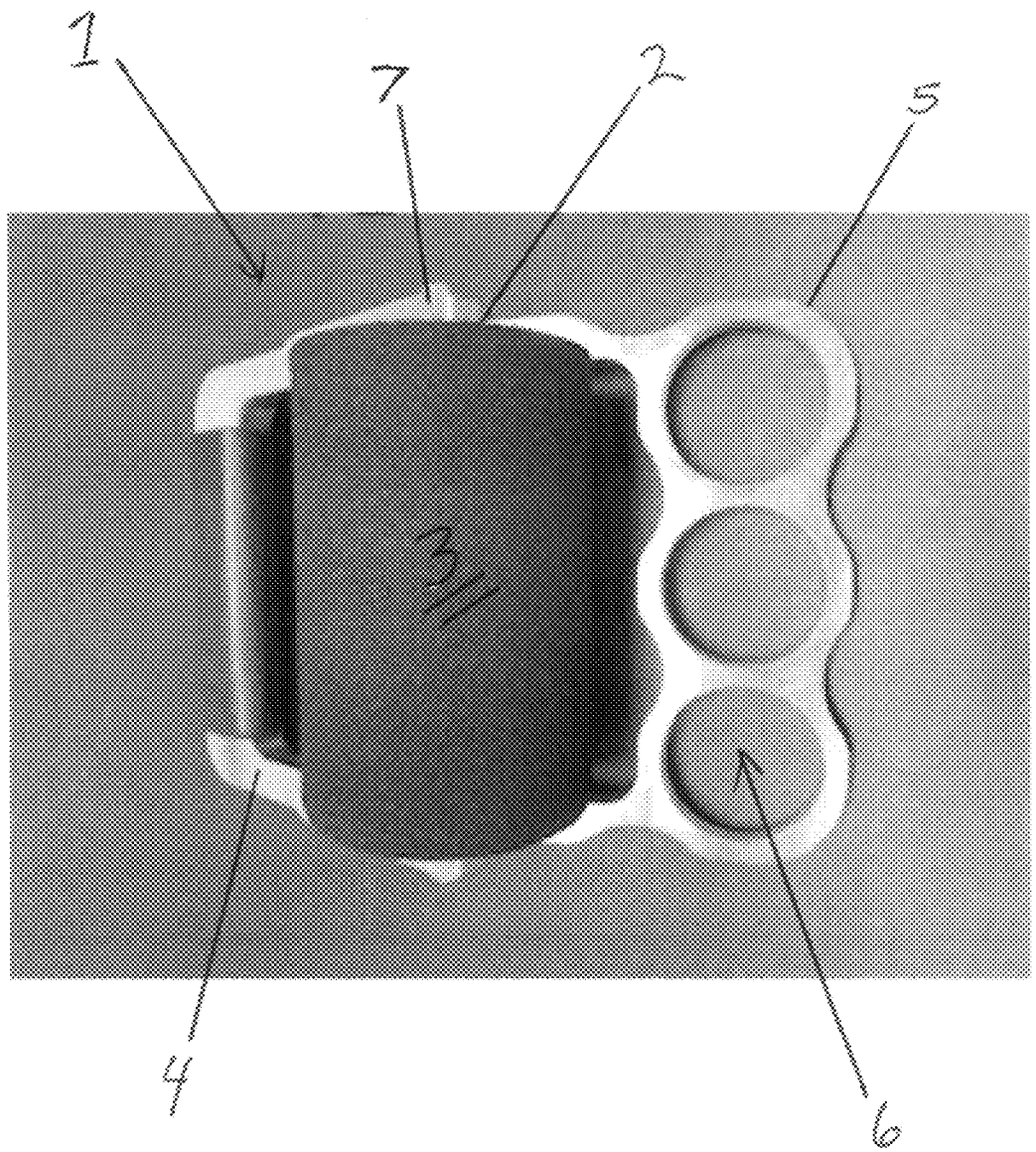
FIG. 6 is an underside (i.e., application side) plan view of a roller device in accordance with one embodiment of the present invention.

FIG. 6 is an underside (i.e., application side) plan view of a roller device in accordance with one embodiment of the present invention shown in FIG. 1, and wherein like numerals refer to like elements.

Figure 7:
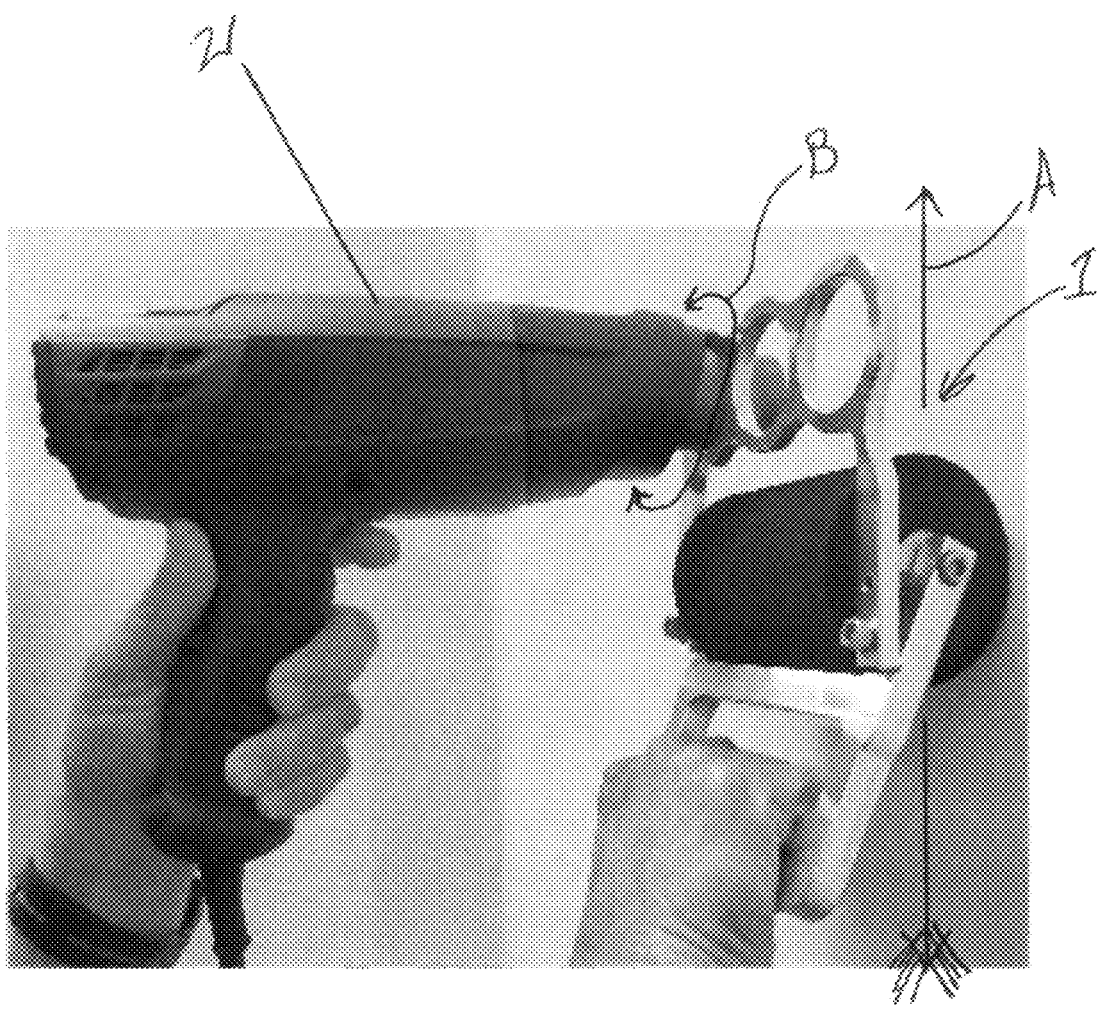
FIG. 7 is a side perspective view of a roller device in accordance with one embodiment of the present invention, as held by an operator in an operative position for applying heat to a section of a sheet material and applying it to a wall, in accordance with one embodiment of the present invention.

FIG. 7 is a side perspective view of a roller device shown in FIG. 1, as held by an operator in an operative position for applying heat to a section of a sheet material and applying it to a wall, in accordance with one embodiment of the present invention. From this Figure, it may be appreciated how the roller device shown in FIG. 1 is used to apply a sheet material to a vertical surface though a upward travel of the roller assembly over the surface (i.e., along direction arrow A) to which the sheet material is being applied in a manner similar to that known in the art. The device and method of the present invention however permits the accurate and controlled application to the sheet material from a pre-set height above the sheet material surface to which the heat is applied and thereby to the application surface to which it is applied.

The operator effectively uses the handle of the heat gun 21 as a supplementary point of contact with the roller device to permit more uniform and controlled application of force which, taken with the more accurate and controlled application of heat to the sheet material as it is being applied, makes possible the more uniform and proper attachment of the sheet material.

The roller device also offers the advantage to the operator of using one hand while the roller device is rotated with respect to the heat gun (such as along the path B shown), thus permitting the operator to change the rolling direction while maintaining the heat gun output directed to the area of sheet material application.

The roller device also offers the advantage of application control to those less experienced in the contemporaneous application of both heat and force to the sheet material as it is being applied.

Figure 8:
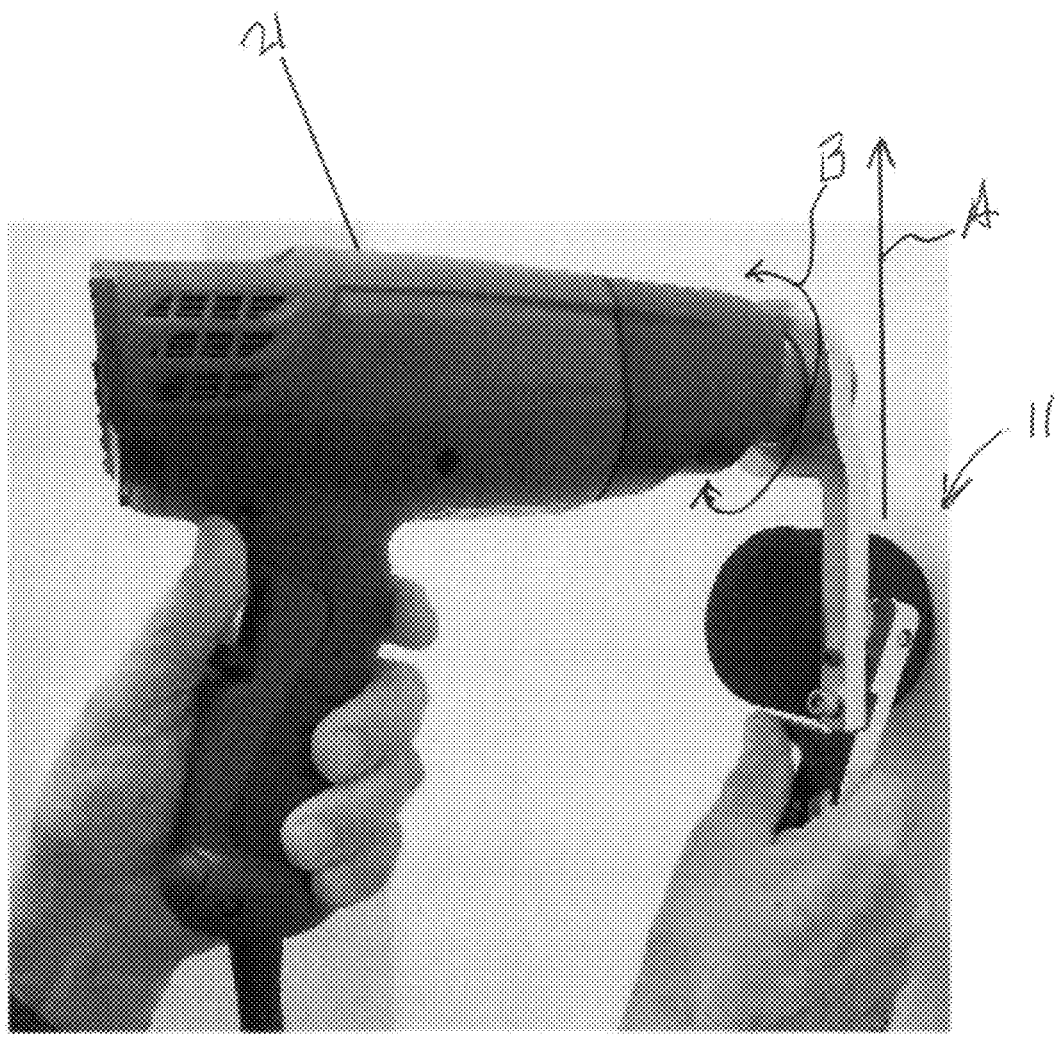
FIG. 8 is a side perspective view of a roller tool in accordance with another embodiment of the present invention, as held by an operator in an operative position for rolling a heated section of a sheet material onto a wall, in accordance with another embodiment of the present invention.

FIG. 8 is a side perspective view of a roller tool shown in FIG. 3, as held by an operator in an operative position for rolling a heated section of a sheet material onto a wall, in accordance with another embodiment of the present invention.

From this Figure, it may be appreciated how the roller device shown in FIG. 3 is used to apply a sheet material to a vertical service though a upward travel of the roller assembly over the surface to which the sheet material is being applied in a manner similar to that known in the art. The device and method of the present invention however permits the accurate and controlled application to the sheet material from a pre-set height above the sheet material surface to which the heat is applied and thereby to the application surface to which it is applied.

Figure 9:
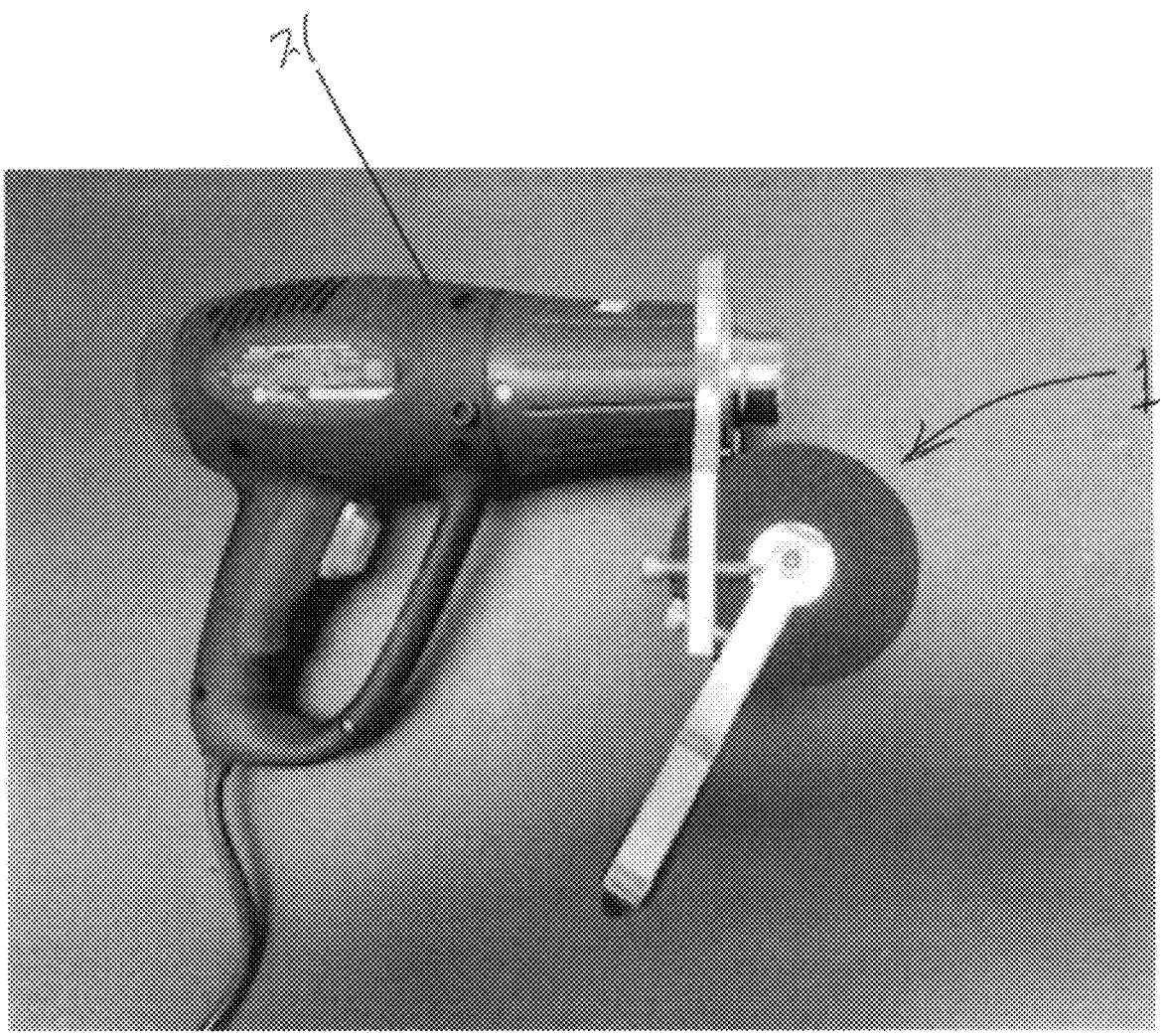
FIG. 9 is a side elevation view of a heat gun engaged with a roller device in accordance with one embodiment of the present invention.

FIG. 9 is a side elevation view of a heat gun engaged with a roller device in accordance with one embodiment of the present invention. This Figure shows attachment/engagement apertures 6 are dimensioned to permit the engagement of the nozzle or output tube of a heat gun such that the heat gun output reaches the sheet material as it is being applied. To accommodate most commercially available heat guns 21, the attachment/engagement apertures must be at least one inch in diameter and typically will be in the range of from about 1 inch to about 3 inches in diameter.

In this embodiment, the nozzle or output tube of a heat gun 21 may fit loosely, but with sufficiently little play that the operator may effectively use the handle of the heat gun 21 as a second handhold to guide and depress the roller 2 against the sheet material as it is being applied. The one or more attachment/engagement apertures 6 may be dimensioned to permit the end of the nozzle or output tube of a heat gun 21 may extend through the aperture(s), but, by virtue of a portion of greater width of the upstream nozzle or output tube of a heat gun (or even a lip or tother interferent structure thereupon), whether existing in the commercially available device as shown in FIG. 9, or additionally attached) may bear against the upper side of the roller attachment/engagement bracket 5 to be able to transmit hand force therethrough to the roller 2.

The roller device of the present invention provides an efficient roller, which may vary in size (compare FIGS. 1 and 2 to FIG. 3, for example) on a relatively compact tool. The roller device of the present invention provides the operator the ability to mount and hold the desired electric heat source by virtue of the optionally adjustable attachment/engagement bracket over the top of the roller, making it possible for the user/installer to work one handed with the option to hold or not hold the necessary heat source for the installation of the material. When used, either right- or left-handed operation, the mounted heat gun bracket allows the installer to adjust the distance between the heat and the substrate assuring the right amount of heat will flow over the material across the entire width of the roller, and this may be done even with pressure from the installer across the entire width of the roller with very little effort during application thus relieving the air from the underside of the adhesive material causing a regression of air which in turn aids the adhesion of the material to the intended substrate.

Figure 10:
FIG. 10 is a photograph of an environmental view showing use of a heat gun optionally prior to the use of the heat gun engaged with a roller device in accordance with one embodiment of the present invention.

FIG. 10 is a photograph of an environmental view showing use of a heat gun optionally prior to the use of the heat gun engaged with a roller device in accordance with one embodiment of the present invention.

Figure 11:
FIG. 11 is a photograph of an environmental view showing the vertical-stroke use of a heat gun engaged with a roller device in accordance with one embodiment of the present invention.

FIG. 11 is a photograph of an environmental view showing the vertical-stroke use of a heat gun engaged with a roller device in accordance with one embodiment of the present invention. This Figure shows that in some embodiments the heat gun engaged with a roller device may be urged against the sheet material surface to urge it against the application surface using generally vertical strokes where the sheet material (and disuniformities in the application surface (such as rivets as shown), or sheet material edges) may require.

Figure 12:
FIG. 12 is a photograph of an environmental view showing the vertical-stroke use of a heat gun engaged with a roller device in accordance with one embodiment of the present invention.

FIG. 12 is a photograph of an environmental view showing the vertical-stroke use of a heat gun engaged with a roller device in accordance with one embodiment of the present invention. This Figure shows that in some embodiments the heat gun engaged with a roller device may be urged against the sheet material surface to urge it against the application surface using generally vertical strokes where the sheet material (and disuniformities in the application surface, or sheet material edges) may require.

Figure 13:
FIG. 13 is a photograph of an environmental view showing the vertical-stroke use of a roller device without engaged heat gun, in accordance with one embodiment of the present invention.

FIG. 13 is a photograph of an environmental view showing the vertical-stroke use of a roller device without engaged heat gun, in another embodiment of the present invention.

Figure 14:
FIG. 14 is a photograph of an environmental view showing the horizontal-stroke use of a heat gun engaged with a roller device in accordance with one embodiment of the present invention.

FIG. 14 is a photograph of an environmental view showing the horizontal-stroke use of a heat gun engaged with a roller device in accordance with another embodiment of the present invention. This Figure shows that in some embodiments the heat gun engaged with a roller device may be urged against the sheet material surface to urge it against the application surface using generally horizontal strokes where the sheet material (and disuniformities in the application surface (such as mortar grooves or sheet material edges) may require.

Figure 15:
FIG. 15 is a photograph of an environmental view showing the vertical-stroke use of a heat gun engaged with a roller device in accordance with one embodiment of the present invention.

FIG. 15 is a photograph of an environmental view showing the vertical-stroke use of a heat gun engaged with a roller device in accordance with another embodiment of the present invention. This Figure shows that in some embodiments the heat gun engaged with a roller device may be urged against the sheet material surface to urge it against the application surface using generally vertical strokes where the sheet material (and disuniformities in the application surface (such as mortar grooves or sheet material edges), may require.

Figure 16:
FIG. 16 is a photograph of an environmental view showing the vertical-stroke use of a heat gun engaged with a roller device in accordance with one embodiment of the present invention.

FIG. 16 is a photograph of an environmental view showing the vertical-stroke use of a heat gun engaged with a roller device in accordance with another embodiment of the present invention. This Figure shows that in some embodiments the heat gun engaged with a roller device may be urged against the sheet material surface to urge it against the application surface using generally vertical strokes where the sheet material (and disuniformities in the application surface (such as mortar grooves or sheet material edges), may require.

Figure 17:
FIG. 17 is a photograph of an environmental view showing the vertical-stroke use of a heat gun engaged with a roller device in accordance with one embodiment of the present invention.
Figure 18:
FIG. 18 is a photograph of an environmental view showing the horizontal-stroke use of a heat gun engaged with a roller device in accordance with one embodiment of the present invention.

FIG. 17 is a photograph of an environmental view showing the vertical-stroke use of a heat gun engaged with a roller device in accordance with another embodiment of the present invention. This Figure shows that in some embodiments the heat gun engaged with a roller device may be urged against the sheet material surface to urge it against the application surface using generally vertical strokes where the sheet material (and disuniformities in the application surface (such as mortar grooves or sheet material edges) may require. This view shows how the edge of the roller may be used to impress the sheet material into mortar grooves FIG. 18 is a photograph of an environmental view showing the horizontal-stroke use of a heat gun engaged with a roller device in accordance with another embodiment of the present invention. This Figure shows that in some embodiments the heat gun engaged with a roller device may be urged against the sheet material surface to urge it against the application surface using generally horizontal strokes where the sheet material edges (and disuniformities in the application mortar grooves) may require.

Figure 19:
FIG. 19 is a photograph of an environmental view showing the horizontal-stroke use of a heat gun engaged with a roller device in accordance with one embodiment of the present invention.

FIG. 19 is a photograph of an environmental view showing the horizontal-stroke use of a heat gun engaged with a roller device in accordance with another embodiment of the present invention. This Figure shows that in some embodiments the heat gun engaged with a roller device may be urged against the sheet material surface to urge it against the application surface using generally horizontal strokes where the sheet material (and disuniformities in the application surface such as mortar grooves) may require.

Figure 20:
FIG. 20 is a photograph of an environmental view showing the vertical-stroke use of a heat gun engaged with a roller device in accordance with one embodiment of the present invention.

FIG. 20 is a photograph of an environmental view showing the vertical-stroke use of a heat gun engaged with a roller device in accordance with another embodiment of the present invention. This Figure shows that in some embodiments the heat gun engaged with a roller device may be urged against the sheet material surface to urge it against the application surface using generally vertical strokes where the sheet material (and disuniformities in the application surface and sheet material edges) may require.

Figure 21:
FIG. 21 is a photograph of an environmental view showing the horizontal-stroke use of a heat gun engaged with a roller device in accordance with one embodiment of the present invention.

FIG. 21 is a photograph of an environmental view showing the horizontal-stroke use of a heat gun engaged with a roller device in accordance with another embodiment of the present invention. This Figure shows that in some embodiments the heat gun engaged with a roller device may be urged against the sheet material surface to urge it against the application surface using generally horizontal strokes where the sheet material (and disuniformities in the application surface) may require.

It will be appreciated that, owing to the rotatable fit or fixation of the heat gun engaged with a roller device of the present invention, the heat gun and roller device can be rotated with respect to one another so as to present any angle between the heat gun handle and that of the roller device, to facilitate making angled strokes against the sheet material with respect to the vertical or horizontal directions.

Figure 22:
FIG. 22 is a photograph of an environmental view showing the vertical-stroke use of a heat gun engaged with a roller device in accordance with one embodiment of the present invention and showing the optional one-hand use of the operation.

FIG. 22 is a photograph of an environmental view showing the vertical-stroke use of a heat gun engaged with a roller device in accordance with another embodiment of the present invention and showing the optional one-hand use of the operation (sheet material not shown). This Figure shows that in some embodiments the heat gun made be engaged through an interferent fit allowing the roller device to be used with one hand, and to be rotated to various positions to permit vertical-, horizontal-, or otherwise angled-stroke use of a heat gun engaged with a roller device.

The roller device of the present invention may thus be used for applying pressure sensitive adhesive articles which have usefulness as industrial graphics images such as those used on textured walls, as well as decorative coverings such as wallpaper, low energy plastics and textured plastics, etc., requiring heat for application, to various surfaces including but not limited to vehicles, indoor and outdoor walls, low energy and textured plastics, indoor and outdoor floors, textured and uneven surfaces and smooth substrates such as those used for signage or changing color with adhesive media.

The roller device of the present invention is also advantageous as to the placement of the heat source as it permits the installer, while using one hand, to install the media while changing the direction of the roller by simply rotating the handle with respect to the handle of the heat source with the heat source remaining in the holding area. This is an advantage to the installer as it allows the roller to go up, down and side-to-side without lifting and re-positioning back to a starting point which reduces the time spent on installation and provides a more efficient method to the installation.

This invention has industry specific mass marketing appeal due to the vast number of businesses including but not limited to graphics businesses, sign businesses, window tinting businesses, vehicle wrap businesses, and vinyl wrap businesses that could benefit from the use of this apparatus on a regular basis as the invention allows an easier more efficient adhesive material installation process.

Although the present invention has been described and illustrated with respect to a preferred embodiment and a preferred use therefore, it is not to be so limited since modifications and changes can be made therein which are within the full intended scope of the invention.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A roller device, comprising:
   a. a roller bracket rotatably supporting a roller having a roller surface;
   b. a handle portion extending along a first direction from said roller bracket; and
   c. a heat gun-roller attachment/engagement bracket extending a second direction from said roller bracket and having at least one aperture adapted to releasably engage a output tube of a heat gun;
   wherein said heat gun-roller attachment/engagement bracket extends at an obtuse angle to said handle portion.

2. The roller device according to claim 1, wherein said heat gun-roller attachment/engagement bracket extends at an angle to said handle portion, and said roller device comprising an adjustable attachment between said heat gun-roller attachment/engagement bracket and said roller bracket, such that said angle may be varied.

3. The roller device according to claim 1, wherein said roller rotates about a roller axis, and said handle portion extends substantially perpendicular to the roller axis.

4. The roller device according to claim 1, wherein said heat gun-roller attachment/engagement bracket has at least two apertures adapted to releasably engage the output tube of the heat gun.

5. A sheet material application system comprising:
   a. a roller bracket rotatably supporting a roller having a roller surface;
   b. a handle portion extending along a first direction from said roller bracket; and
   c. a heat gun-roller attachment/engagement bracket extending a second direction from said roller bracket, and having at least one aperture to releasably engage a output tube of a heat gun; and
   d. the heat gun having a handle and an output nozzle, said output nozzle releasably extending through said at least one aperture;
   wherein said heat gun-roller attachment/engagement bracket extends at an obtuse angle to said handle portion.

6. The sheet material application system according to claim 5, wherein said heat gun-roller attachment/engagement bracket extends at an angle to said handle portion, and said system comprising an adjustable attachment between said heat gun-roller attachment/engagement bracket and said roller bracket, such that said angle may be varied.

7. The sheet material application system according to claim 5, wherein said heat gun having an output nozzle, said output nozzle rotatably extending through said at least one aperture.

8. The sheet material application system according to claim 5, wherein said heat gun-roller attachment/engagement bracket has at least two apertures adapted to releasably engage the output tube of the heat gun.

9. A method of applying a sheet material to a surface by a heat-activated adhesive borne on the sheet material using an integrated roller system having at least one handle and an affixed roller, the method comprising the steps:
   a. placing the sheet material against the surface having a contour;
   b. directing heat toward the sheet material so as to activate the heat-activated adhesive, said heat being directed from a sheet material application system comprising:
      1. A roller bracket rotatably supporting a roller having a roller surface;
      2. A handle portion extending along a first direction from said roller bracket; and
      3. A heat gun-roller attachment/engagement bracket extending a second direction from said roller bracket, and having at least one aperture to releasably engage an output tube of a heat gun; and
      4. A heat gun having the heat gun handle and an output nozzle, said output nozzle releasably extending through said at least one aperture;
   c. orienting said handle portion so as to place the roller against the sheet material; and
   d. smoothing the sheet material against the surface with said roller so as to adhere a first portion of said sheet material onto the surface, such that said first portion of said sheet material follows the contour of said surface;
   e. rotating said handle portion with respect to said heat gun handle following step d.

10. The method of applying a sheet material according to claim 9, additionally comprising smoothing said sheet material against the surface with said roller so as to adhere a second portion of said sheet material onto the surface, such that said second portion of sheet material follows the contour of said surface.

* * * * *